United States Patent Office 3,387,008
Patented June 4, 1968

3,387,008
PROCESS FOR MAKING A SUBSTANTIALLY ESTER FREE FATTY ACID ALKANOLAMIDE PRODUCT
John D. Cawley, Rochester, N.Y., assignor to Eastman Kodak Company, Rochester, N.Y., a corporation of New Jersey
No Drawing. Filed June 28, 1965, Ser. No. 472,073
10 Claims. (Cl. 260—404)

ABSTRACT OF THE DISCLOSURE

Alkanolamides of fatty acids of particular utility as surfactants are prepared by reacting a fatty acid ureide, such as palmitic ureide, with a primary alkanolamine, such as ethanolamine, or a secondary alkanolamine, such as diethanolamine.

---

This invention resides in the chemical arts. In particular, it relates to the synthesis of alkanolamides of fatty acids.

Alkanolamides of fatty acids, also referred to as fatty acid alkanolamides and as hydroxyamides of fatty acids, are compounds represented by the formula:

$$R-\overset{O}{\underset{\|}{C}}-N\overset{R'}{\underset{R''-OH}{\diagdown}}$$

wherein $$R-\overset{O}{\underset{\|}{C}}-$$

is the acyl moiety of a fatty acid, R' is a radical selected from the group consisting of hydrogen and —R″—OH radicals, and R″ is an alkylene radical. These compounds in general have surface active properties which make them important surfactants. Examples of these compounds include fatty acid diethanolamides which are represented by the formula:

$$R-\overset{O}{\underset{\|}{C}}-N\overset{CH_2CH_2-OH}{\underset{CH_2CH_2-OH}{\diagdown}}$$

wherein $$R-\overset{O}{\underset{\|}{C}}-$$

is the acyl moiety of a fatty acid.

Heretofore, alkanolamides of fatty acids generally have been made from fatty acids or their esters. The resulting products, in addition to fatty acid alkanolamides, also comprise substantial percentages of monoester amides and diester amides. Thus, for example, fatty acid diethanolamide products made from fatty acids or their esters usually contain large concentrations of monoester amides according to the formula:

$$R-\overset{O}{\underset{\|}{C}}-N\overset{CH_2CH_2-O-\overset{O}{\underset{\|}{C}}-R}{\underset{CH_2CH_2-OH}{\diagdown}}$$

and diester amides according to the formula:

$$R-\overset{O}{\underset{\|}{C}}-N\overset{CH_2CH-O-\overset{O}{\underset{\|}{C}}-R}{\underset{CH_2CH-O-C-R}{\diagdown}}$$

Monoester amides and diester amides are poor surfactants and their presence depresses, for example, the foaming property of fatty acid alkanolamides.

Processes have been reported for making fatty acid alkanolamide products having low concentrations of monoester amides and diester amides, which products have been referred to as superamides. Examples of such processes are the processes disclosed in the U.S. patent, No. 3,107,258, to Lamberti et al. and the Canadian patent, No. 633,480, of Schurman. However, these processes are time consuming, the Lamberti et al. process taking 5 hours and the Schurman process taking 2 days.

An object of this invention is to provide a process for making a fatty acid alkanolamide product substantially free of monoester amides and diester amides, which process can be rapidly performed.

Another object of this invention is to provide such a process which can be practiced with readily available materials and equipment.

These and other objects as may appear as this specification proceeds are achieved by this invention.

In summary, this invention comprises a process for making a substantially ester free, fatty acid alkanolamide product, which process can be practiced in a period of time ranging from about 1 minute to about 3 hours. This process comprises contacting at a temperature in a range from about 150 to about 250° C. for a period of time in a range from about 1 minute to about 3 hours substantially ester free, fatty acid ureide material and substantially ester-free alkanolamine material selected from the group consisting of sterically free primary and secondary alkanolamines.

Substantially ester free, fatty acid ureide material consists essentially of at least one compound according to the formula:

$$R-\overset{O}{\underset{\|}{C}}-NH-\overset{O}{\underset{\|}{C}}-NH_2$$

wherein $$R\overset{O}{\underset{\|}{C}}-$$

is a fatty acid acyl moiety. The number of carbon atoms in the fatty acid acyl moiety is generally in a range from about 4 to about 24, and preferably in a range from about 8 to about 18. More than 24 carbon atoms, however, are within the concepts of this invention. Examples of fatty acid ureides according to the formula are lauric ureide, palmitic ureide, oleic ureide, linoleic ureide, palmitoleic ureide, and the like. Fatty acid ureide material is readily obtained by reacting in pyridine one or more fatty acid chlorides and urea [see Iowa State Coll. J. Sci., 12, 121 (1937)], by reacting with an alkaline, molecular rearrangement catalyst in a lower alcohol fatty acid triglyceride material and urea (see the U.S. patent, No. 2,574,864, to Eckey), by reacting with sodium ethylate in ethanol-pyridine a fatty acid ethyl ester and urea [see Compt. rend., 196, 1810 (1933)], by reacting sodium urea and fatty acid esters (see the U.S. patents, Nos. 2,090,594 and 2,090,595, to Jacobson), and by reacting sodium urea and fatty acid chlorides (see the U.S. patent, No. 2,090,593, to Jacobson).

Substantially ester free alkanolamine material consists essentially of at least one compound according to the formula:

$$H-N\overset{R'}{\underset{R''-OH}{\diagdown}}$$

wherein R' is a radical selected from the group consisting of hydrogen and —R″—OH radicals and R″ is a sterically unhindering alkylene radical. A sterically unhindering or sterically free alkylene radical is one which does not sterically hinder reaction of the parent compound. Generally such a radical has only primary or secondary carbon atoms, and has no tertiary carbon atoms such as, for example, in the case of tertiary butyl type radicals. Examples of sterically free alkanolamines according to the formula are, diethanolamine, ethanolamine, propanolamine, dipropanolamine, isopropanolamine, di-isopropanolamine, diglycolamine

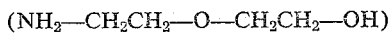

and the like. In addition to one alkanolamine according to the formula the substantially ester free alkanolamine material can comprise one or more other alkanolamines according to the foregoing formula. Substantially ester free alkanolamine materials are commercially available or can be readily obtained.

The quantities of fatty acid ureide material and alkanolamine material employed in the process of this invention are preferably at least chemically equivalent quantities, although larger and smaller quantities of either material can be employed. However, when a secondary alkanolamine such as diethanolamine and the like is present in substantial concentration some unsubstituted fatty acid amide

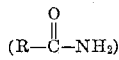

is formed. The concentration of the unsubstituted fatty acid amide formed increases as the weight ratio of the secondary alkanolamine to the ureide decreases. Consequently, it is preferred that the alkanolamine material, when one or more secondary alkanolamines are present in substantial concentration, be in stoichiometric excess. Also, for convenience in one procedure for isolating the alkanolamide product it is preferred that the alkanolamine material be present in stoichiometric excess. For these reasons, therefore, it is preferred to use 4–5 milliliters of alkanolamine material per gram of fatty acid ureide material.

The step of contacting the alkanolamine material with the fatty acid ureide material under the stated conditions results in a chemical reaction which can be depicted by the following equation:

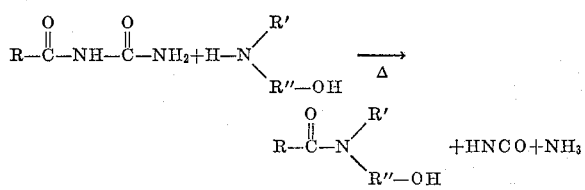

The reaction proceeds as the fatty acid ureide material dissolves. Below about 150° C., however, it is slow. However, at temperatures in a range from about 150 to about 250° C. the reaction is rapid and is usually over in about 1 hour or less. On the other hand, the readily detectable gas ammonia evolves during the reaction and it is preferred to maintain reaction conditions until ammonia evolution has completely ceased, which generally takes from about ½ to about 1 and ½ hours longer. The reaction mixture which remains contains the desired alkanolamide product, substantially free of ester amides.

The desired alkanolamide product can be isolated by extracting the reaction mixture with a solvent in which the alkanolamide product is soluble and the alkanolamine material is insoluble. Isopropyl ether is frequently such a solvent. Under the concepts of this invention the desired alkanolamide product also can be separated from the reaction mixture by other procedures.

This invention is further illustrated by the following specific examples which include specific embodiments of this invention. This invention is not limited to these specific embodiments unless otherwise indicated.

Example 1

This example illustrates the synthesis of substantially ester amide free palmitic ethanolamide product according to a specific embodiment of the process of this invention.

5 grams (0.017 mole) of palmitic ureide and 20 milliliters (20.4 grams; 0.33 mole) of ethanolamine, which has a boiling point of 172° C., are admixed and refluxed 1 and ¾ hours. Generally, ammonia evolves vigorously for the first ½ hour. The resulting reaction mixture is cooled, poured into water, the solids filtered off, washed and dried. The product thus obtained consists essentially of palmitic ethanolamide and is substantially free of ester amides. This can be verified by infrared absorption analysis. A typical quantity of product thus obtained is 5 grams (0.017 mole), representing a 100% yield.

Example 2

This example illustrates the synthesis of a substantially ester amide free palmitic diethanolamide product according to a specific embodiment of the process of this invention.

10 grams (0.034 mole) of palmitic ureide and 50 milliliters (55 grams; 0.52 mole) of diethanolamine are admixed and then stirred at 160–180° C. until no more ammonia evolves, a period of time of about 2 and ¾ hours. The reaction mixture is cooled, poured onto ice, made acid with hydrochloric acid, and extracted with diethyl ether. Upon removal as by evaporation of the diethyl ether from the extract, there remains a crude, crystalline product. This product consists essentially of palmitic diethanolamide and is substantially free of ester amide material. A typical quantity of the crude product obtained under these conditions is 9.0 grams. The crude product is admixed with warm methanol, the resulting solution filtered to remove palmitamide, which is methanol insoluble, and the resulting filtrate cooled to crystallize out the desired product. A typical quantity of palmitamide thus removed is 1.3 grams.

Example 3

This example illustrates the synthesis of a substantially ester amide free palmitic diglycolamide product according to a specific embodiment of the process of this invention.

10 grams (0.034 mole) of palmitic ureide and 45 milliliters (47.7 grams; 0.454 mole) of diglycolamine, which has a boiling point of 220° C., are admixed and refluxed 1 and ½ hours. The resulting reaction mixture is cooled and diluted with 50 milliliters of methanol. The diluted reaction mixture is cooled by refrigeration to a temperature of 10–15° C. and then filtered to separate therefrom the crude, solid product. It consists essentially of palmitic diglycolamide and is substantially free of ester amides. The product can be recrystallized from methanol to purify it.

Example 4

This example illustrates the synthesis of a substantially ester amide free lauric diethanolamide product according to a specific embodiment of the process of this invention.

20 grams (0.083 mole) of lauric ureide and 100 milliliters (110 grams; 1.04 moles) of diethanolamine are stirred and heated at 155–168° C. for 1¾ hours. After cooling, the resulting reaction mixture is extracted three times with 100 milliliter portions of isopropyl ether. The extracts are combined and the isopropyl ether removed by evaporation. The residue is a soft solid. It consists essentially of lauric diethanolamide and is substantially free of ester amides. A typical quantity of the residue is 24.7 grams. By crystallizing the product from methanol, lauramide is removed, a typical quantity of lauramide being thus removed being 3.1 grams. Upon removal of methanol, the result is a product which consists essentially of lauric diethanolamide. At 20–25° C. the product is an oil.

Example 5

This example illustrates the synthesis of a substantially ester amide free lauric diglycolamide product according to a specific embodiment of the process of this invention.

20 grams (0.083 mole) of lauric ureide and 100 milliliters (106 grams; 1.01 moles) of diglycolamine are refluxed for 2 hours. The resulting reaction mixture is cooled and then extracted three times with 100 milliliter quantities of isopropyl ether. The extracts are combined and the isopropyl ether removed therefrom by evaporation. The residue is a solid which consists essentially of lauric diglycolamide and which is substantially free of ester amides. A typical quantity of solid thus obtained is 19.2 grams. The solid material can be subjected to methanol crystallization to purify the product.

Example 6

This example illustrates the preparation of a substantially ester amide free oleic diethanolamide product according to a specific embodiment of the process of this invention.

15 grams (0.047 mole) of oleic ureide material prepared from olive oil and 75 milliliters (82.3 grams; 0.78 mole) of diethanolamine are admixed, stirred and heated at 165–210° C. for 1 and ½ hours. The resulting reaction mixture is cooled and then extracted with isopropyl ether. Evaporation of isopropyl ether from the extract leaves the reaction product which consists essentially of oleic diethanolamide and which is substantially free of ester amides. A typical quantity of reaction product thus obtained is 10.3 grams. Crystallization of the reaction product from acetone removes oleamide, 0.9 gram being the quantity of oleamide typically removed. The residue, an oil at 20–25° C., is the desired product.

Example 7

This example illustrates the preparation of a substantially ester amide free oleic diglycolamide product according to a specific embodiment of the process of this invention.

20 grams (0.063 mole) of oleic ureide material prepared from olive oil and 100 milliliters (106 grams; 1.01 moles) of diglycolamine are refluxed together 2 and ½ hours. The resulting reaction mixture is cooled, extracted four times with 125 milliliter portions of isopropyl ether. The extracts are combined and the isopropyl ether removed by evaporation. The residue comprises a mixture of reaction product and diglycolamine. The mixture is dissolved in acetone and the solution cooled to −20° C., whereby the reaction product crystallizes. The reaction product consists essentially of oleic diglycolamide. It is substantially free of ester amides. A typical quantity of the reaction product thus obtained is 25.0 grams. Subjection of the reaction product to crystallizations from acetone gives substantially pure oleic diglycolamide.

Thus, there is provided a process for making ester free alkanolamides of fatty acids, which process can be performed in a practical, short period of time. The process employs readily available materials and can be practiced in conventional equipment.

Other features, specific embodiments and advantages will be readily apparent to those in the exercise of ordinary skill in the art after reading the foregoing disclosures.

In this connection, while specific embodiments of this invention have been described in considerable detail, variations and modifications of these specific embodiments can be effected without departing from the spirit and scope of the invention as disclosed and claimed.

I claim:

1. A process for preparing a fatty acid alkanolamide comprising contacting a ureide of the formula:

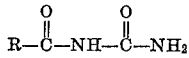

wherein

is a fatty acid acyl group of 4 to 24 carbon atoms, with an alkanolamine of the formula:

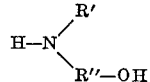

wherein R' is a member selected from the group consisting of hydrogen and radicals of the formula R''—OH and R'' is a sterically free alkylene radical, for a period of from about 1 minute to about 3 hours at a temperature of from about 150° C. to about 250° C.

2. The process of claim 1 wherein

is a fatty acid acyl group of 8 to 18 carbon atoms.

3. The process of claim 1 wherein said alkanolamine is a secondary alkanolamine and is present in stoichiometric excess relative to said ureide.

4. The process of claim 1 wherein said ureide is palmitic ureide.

5. The process of claim 1 wherein said ureide is lauric ureide.

6. The process of claim 1 wherein said ureide is oleic ureide.

7. The process of claim 1 wherein said alkanolamine is ethanolamine.

8. The process of claim 1 wherein said alkanolamine is diethanolamine.

9. The process of claim 1 wherein said alkanolamine is diglycolamine.

10. The process of claim 1 wherein the alkanolamine is recovered by extracting the reaction product with a solvent in which said alkanolamine is soluble and said alkanolamine is insoluble.

References Cited
UNITED STATES PATENTS

| | | | |
|---|---|---|---|
| 1,989,968 | 2/1935 | Bruson | 260—404 |
| 2,496,631 | 2/1950 | Leupold et al. | 260—404 X |
| 2,574,864 | 11/1951 | Eckey et al. | 260—404.5 |
| 2,844,609 | 7/1958 | Tesoro | 260—404 |
| 2,877,246 | 3/1959 | Schurman | 260—404 |
| 3,040,075 | 6/1962 | Lohr | 260—404 |

NICHOLAS S. RIZZO, *Primary Examiner.*

F. A. MIKE, *Assistant Examiner.*